(No Model.)

H. BRAMM.
MACHINE BELT FASTENER.

No. 374,582. Patented Dec. 13, 1887.

Witnesses
L. H. Bartlett.
A. P. Vandeventer.

Inventor
Henry Bramm
by F. B. Brock
Attorney

UNITED STATES PATENT OFFICE.

HENRY BRAMM, OF JERSEY CITY, NEW JERSEY.

MACHINE-BELT FASTENER.

SPECIFICATION forming part of Letters Patent No. 374,582, dated December 13, 1887.

Application filed September 30, 1887. Serial No. 251,117. (No model.)

*To all whom it may concern:*

Be it known that I, HENRY BRAMM, a citizen of the United States, residing at Jersey City, in the county of Hudson and State of New Jersey, have invented certain new and useful Improvements in Machine-Belt Fasteners; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

Figure 1:
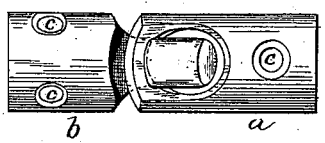
Figure 2:
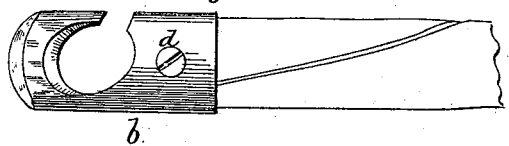
Figure 3:
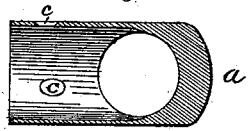
Figure 4:

Figure 1 represents a side elevation of my improved belt-fastener, showing both parts of the coupling. Fig. 2 is a detached view of part of the fastener attached to a section of round belting. Fig. 3 represents a central vertical section of one part of the belt-fastening, and Fig. 4 is a transverse section through one part of the coupling.

Heretofore similar belt-fasteners have been used for the purpose of coupling the ends of round belting in the manufacture of endless driving-belts; but such constructions have commonly been made quite complex in their construction. In other cases they have been provided with an interior screw-thread, which, on account of the thickness of metal necessarily employed, rendered necessary the cutting down of the belt to such a degree as to materially weaken it, or else the metal projected unduly beyond the surface of the belt, so that the belt-fastener would not run successfully around the pulleys upon which it worked. Again, where the fastener had a smooth interior bore, some such device for fastening it as is, for example, shown in the patent of Abiel Codding, Jr., No. 39,121, was employed, which, when once set to fasten the belt to the coupling, did not admit of its again being adjusted to compensate for the stretching of the belt.

My improvement consists in the following construction, which will now be fully described, and the points of novelty then set forth in the claim.

$a$ represents one half of the belt-fastener, and $b$ the other portion. The part $a$ has preferably an eye-coupling, and part $b$ a hook which takes into the eye. Both parts may, however, be provided with a hook. Both halves have a smooth interior cylindrical bore of substantially the same diameter as that of the round belting intended to be secured therein. The metal constituting the cylinder is made quite thin, so that the diameter of the belt at the fastener is substantially the same.

$c$ are a series of holes made diametrically through the couplings at different points of the periphery of the cylinders thereof.

$d$ are a series of screws or pins which are inserted through the holes $c$ and through the leather belting, and securely fasten the ends of the belt to the fastener.

In practice round leather belting stretches easier and is found to require a greater number of adjustments to compensate for the gradual and continual stretching of the belt. For these reasons it is eminently desirable that a belt-fastener be used which may be quickly and simply adjusted from time to time as the belt stretches. For this purpose it is requisite that no special preparation of the shortened end of the belt be made, which would not only consume additional time, but materially weaken the belt and endanger its breakage. Moreover, several successive adjustments are often necessary before the right degree of tension is secured, and which, where the belt has to be cut away or prepared for a screw-thread, often renders the belt unfit for further use in that place. Again, the screw-threads on the leather belt sometimes tear out.

In my invention the parts of the belt-fastener are simply slipped over the meeting opposite ends of the belt, and successive cuttings may be taken off one or both of the ends until the required tension of the belt is effected. The pins or screws are then inserted, of which there are preferably three on each coupling part, and the belt is ready for use. This fastener has been subjected to severe strains and the pins have been found to hold perfectly.

The round belting of leather is quite elastic and adjustments are rendered necessary from time to time. These adjustments, where no preparation of the leather ends (other than to cut them off) is necessary, are therefore performed in an expeditious and simple manner.

The pins $d$ may extend nearly or clear across the cylinders, in which case the holes $c$ are arranged in different transverse planes; but when the pins which are used are quite short the holes c are disposed at any point in the periphery.

The holes c are countersunk, so that the screw or pin heads lie flush with the periphery. It will be noticed that the interior bores of the couplings are continued in their full width or diameter clear through into both the hook and eye of the coupling. This construction enables me to get a wider range of adjustment than is possible with other couplings, and also admits of both parts of the coupling being made exceedingly short lengthwise, with the resulting advantage of lying closely to the belt-pulleys of small diameters.

I claim—

The machine-belt fastener herein described, consisting of a two-part coupling having hook or eye fastenings, each of said parts being composed of a thin cylinder having a uniform bore extending into the hook or eye fastening, said cylinders having a series of holes therein, and a series of removable screws or pins adapted to pass through the holes and cylinders, substantially as and for the purposes hereinbefore set forth.

In testimony whereof I affix my signature in presence of two witnesses.

HENRY BRAMM.

Witnesses:
CHAS. A. SCHIEREN,
F. A. A. BURRELL.